(12) United States Patent
Wang et al.

(10) Patent No.: US 9,800,868 B2
(45) Date of Patent: Oct. 24, 2017

(54) IMAGE-STICKING INSPECTION METHOD FOR LIQUID CRYSTAL PANEL AND DEVICE OF THE SAME

(71) Applicant: Shenzhen China Star Optoelectronics Technology Co., Ltd., Shenzhen, Guangdong (CN)

(72) Inventors: Yanxue Wang, Guangdong (CN); Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 78 days.

(21) Appl. No.: 15/171,357

(22) Filed: Jun. 2, 2016

(65) Prior Publication Data

US 2017/0214911 A1 Jul. 27, 2017

(30) Foreign Application Priority Data

Jan. 26, 2016 (CN) .......................... 2016 1 0050655

(51) Int. Cl.
*H04N 17/00* (2006.01)
*H04N 17/02* (2006.01)
*G06T 7/40* (2017.01)

(52) U.S. Cl.
CPC ........... *H04N 17/004* (2013.01); *G06T 7/408* (2013.01); *G06T 2207/10024* (2013.01); *G06T 2207/20056* (2013.01)

(58) Field of Classification Search
USPC ......... 348/189, 180, 191, 46, 47, 48, 49, 50, 348/222.1, 254, 289, 309, 354, 398.1, 348/421.1, 541, 659, 671, 711, 719, 751, 348/761, 766, 790; 345/38, 50, 55, 60,
(Continued)

(56) References Cited

U.S. PATENT DOCUMENTS

| | | | |
|---|---|---|---|
| 8,836,813 B2 * | 9/2014 | Hatano | H04N 9/045 348/222.1 |
| 2005/0008177 A1 * | 1/2005 | Ibrahim | H04R 25/30 381/316 |

(Continued)

*Primary Examiner* — Jefferey F Harold
*Assistant Examiner* — Mustafizur Rahman
(74) *Attorney, Agent, or Firm* — Andrew C. Cheng

(57) ABSTRACT

An image-sticking inspection method and a device. The method includes: after displaying a standard checkerboard image for a period of time, changing to an image having a specified grayscale value and capturing a residual image; respectively performing a fourier transformation to the standard checkerboard and residual image to obtain a first and a second energy spectrum; respectively transforming the first and the second energy spectrum to polar coordinate; for polar angles from 0 to $2\pi$, summing values of each first and second energy spectrum in the polar coordinate to obtain a checkerboard and an image-sticking energy spectrum; obtaining a characteristic frequency corresponding to a maximum value of the checkerboard energy spectrum; obtaining a first and a second energy value respectively corresponding to the characteristic and a zero frequency of the image-sticking energy spectrum; and dividing the first energy value by the second energy value to obtain an image-sticking evaluation value.

8 Claims, 4 Drawing Sheets

(58) Field of Classification Search
USPC ..... 345/87, 89, 96, 104, 182, 214, 426, 634, 345/644, 690
See application file for complete search history.

(56) References Cited

U.S. PATENT DOCUMENTS

| | | | | |
|---|---|---|---|---|
| 2005/0066277 A1* | 3/2005 | Leah | ................ | G06T 11/206 |
| | | | | 715/712 |
| 2006/0132628 A1* | 6/2006 | Suzuki | ................ | G06T 3/4015 |
| | | | | 348/272 |
| 2007/0127095 A1* | 6/2007 | Sugimori | ............ | H04N 1/40068 |
| | | | | 358/520 |
| 2007/0222891 A1* | 9/2007 | Hsu | ................ | H04N 19/40 |
| | | | | 348/453 |
| 2008/0284706 A1* | 11/2008 | Van Dalfsen | ........ | G09G 3/3614 |
| | | | | 345/96 |
| 2009/0096778 A1* | 4/2009 | Su | ............... | G09G 3/006 |
| | | | | 345/214 |
| 2009/0198499 A1* | 8/2009 | Lee | ............... | G10L 19/08 |
| | | | | 704/500 |
| 2010/0091132 A1* | 4/2010 | Chen | ................ | H04N 9/642 |
| | | | | 348/223.1 |
| 2011/0032283 A1* | 2/2011 | Baek | ................ | G09G 3/3413 |
| | | | | 345/690 |
| 2012/0092331 A1* | 4/2012 | Ogawa | ................ | G09G 3/003 |
| | | | | 345/419 |
| 2012/0194562 A1* | 8/2012 | Ivashin | ................ | G09G 3/001 |
| | | | | 345/672 |
| 2013/0002671 A1* | 1/2013 | Armsden | ................ | G06T 15/06 |
| | | | | 345/426 |
| 2013/0271621 A1* | 10/2013 | Lee | ................ | H04N 5/225 |
| | | | | 348/222.1 |
| 2013/0293743 A1* | 11/2013 | Lee | ................ | H04N 5/232 |
| | | | | 348/231.99 |
| 2013/0307883 A1* | 11/2013 | You | ................ | G09G 5/026 |
| | | | | 345/690 |
| 2013/0314629 A1* | 11/2013 | Yasui | ................ | G02B 27/2264 |
| | | | | 349/15 |
| 2014/0002625 A1* | 1/2014 | Yanagidate | ........ | H04N 1/33307 |
| | | | | 348/65 |
| 2015/0256823 A1* | 9/2015 | De Paepe | ............ | H04N 17/04 |
| | | | | 348/177 |

* cited by examiner

IMAGE-STICKING INSPECTION METHOD FOR LIQUID CRYSTAL PANEL AND DEVICE OF THE SAME

FIELD OF THE INVENTION

The present invention relates to a liquid crystal panel manufacturing field, and more particularly to an image-sticking inspection method for liquid crystal panel and device of the same based on digital image processing.

DESCRIPTION OF RELATED ART

In the design and manufacturing process of a liquid crystal panel, an inspection of an image sticking for a liquid crystal panel will be performed. That is, a picture (such as a checkerboard image) is displayed and retained on the liquid crystal panel for a long time, and after changing the display content, observing that if the picture displayed previously is residual, the generation of the image sticking relates to the material, manufacturing process and circuit design of a panel. A common image sticking inspection is based on a JND (Just-noticeable differences) model judging by a human eye. The cost of the above method is high and the subjective factor is high such that objectively quantitatively describing the degree of the image sticking is hard.

SUMMARY OF THE INVENTION

For addressing the above problem, the purpose of the present invention is to provide an image-sticking inspection method for liquid crystal panel and device to quantitatively evaluate the degree of the image sticking.

The present invention provides an image-sticking inspection method for liquid crystal panel, comprising: after displaying a standard checkerboard image for a period of time by a liquid crystal panel, changing a displayed picture of the liquid crystal panel to an image having a specified grayscale value and capturing a residual image of the standard checkerboard image;

processing a digital image of the standard checkerboard image in order to obtain a checkerboard energy spectrum, and processing the residual image of the checkerboard image in order to obtain an image-sticking energy spectrum;

obtaining a characteristic frequency corresponding to a maximum value in all energy values of the checkerboard energy spectrum;

obtaining a first energy value and a second energy value respectively corresponding to the characteristic frequency and a zero frequency in frequencies of the image-sticking energy spectrum; and dividing the first energy value by the second energy value to obtain an image-sticking evaluation value of the residual image.

Wherein, the step of processing a digital image of the standard checkerboard image in order to obtain a checkerboard energy spectrum, and processing the residual image of the checkerboard image in order to obtain an image-sticking energy spectrum comprises: respectively performing a fourier transformation to the digital image of the standard checkerboard image and the residual image in order to obtain a first energy spectrum and a second energy spectrum; wherein, the first energy spectrum corresponds to the digital image of the standard checkerboard image, and the second energy spectrum corresponds to the residual image; and respectively transforming the first energy spectrum and the second energy spectrum to a polar coordinate; for each frequency and with respect to polar angles changing from 0 to $2\pi$, summing values of function of each of the first energy spectrum and the second energy spectrum in the polar coordinate in order to obtain a checkerboard energy spectrum and an image-sticking energy spectrum.

Wherein, the step of respectively performing a fourier transformation to the digital image of the standard checkerboard image and the residual image in order to obtain a first energy spectrum and a second energy spectrum comprises: respectively translating a zero-frequency component of a function of the digital image of the standard checkerboard image and a zero-frequency component of a function of the residual image obtained by the fourier transformation to corresponding centers of spectrum matrixes in order to obtain the first energy spectrum and the second energy spectrum.

Wherein, through assigning values to a matrix that forms the digital image of the standard checkerboard image to obtain the digital image of the standard checkerboard image.

Wherein, the image-sticking inspection method for liquid crystal panel further comprises: adopting a just-noticeable differences (JND) model, changing a JND value of the residual image in order to obtain image-sticking evaluation values corresponding to different JND values.

Wherein, through continuously displaying the standard checkerboard image for the period of time multiple times, under a same grayscale value, adopting the JND model to obtain different JND values of the residual images.

Wherein, the residual image is captured by a standard photo-taking skill.

The present invention also provides an image-sticking inspection device for liquid crystal panel, comprising:

a capture unit for capturing a residual image;

a process unit for generating a digital image of a standard checkerboard image, processing a digital image of the standard checkerboard image in order to obtain a checkerboard energy spectrum, and processing the residual image of the checkerboard image in order to obtain an image-sticking energy spectrum;

obtaining a characteristic frequency corresponding to a maximum value in all energy values of the checkerboard energy spectrum;

obtaining a first energy value and a second energy value respectively corresponding to the characteristic frequency and a zero frequency in frequencies of the image-sticking energy spectrum; and dividing the first energy value by the second energy value to obtain an image-sticking evaluation value of the residual image.

Wherein, the process unit is used for performing a fourier transformation to the digital image of the standard checkerboard image and the residual image in order to obtain a first energy spectrum and a second energy spectrum, wherein, the first energy spectrum corresponds to the digital image of the standard checkerboard image, and the second energy spectrum corresponds to the residual image; and used or respectively transforming the first energy spectrum and the second energy spectrum to a polar coordinate; for each frequency and with respect to polar angles changing from 0 to $2\pi$, summing values of function of each of the first energy spectrum and the second energy spectrum in the polar coordinate in order to obtain a checkerboard energy spectrum and an image-sticking energy spectrum.

Wherein, the image-sticking inspection device further includes a display unit, and the display unit is used for displaying the image-sticking evaluation value of the residual image.

In the image-sticking inspection method and device provided by the present invention, through performing a fourier transformation to the digital image of the standard checkerboard image and the residual image to obtain respective spectrum function, obtaining the energy strength of the image sticking of the residual image according to the characteristic frequency of the digital image of the standard checkerboard image, and using a ratio of the energy strength of the image sticking of the residual image to the background brightness of the residual image to obtain the image-sticking evaluation value. The present invention can quantitatively evaluate the degree of the image sticking solve inaccurate judgment problem of traditional JND model because of affecting by subjective factors.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

Figure 1:
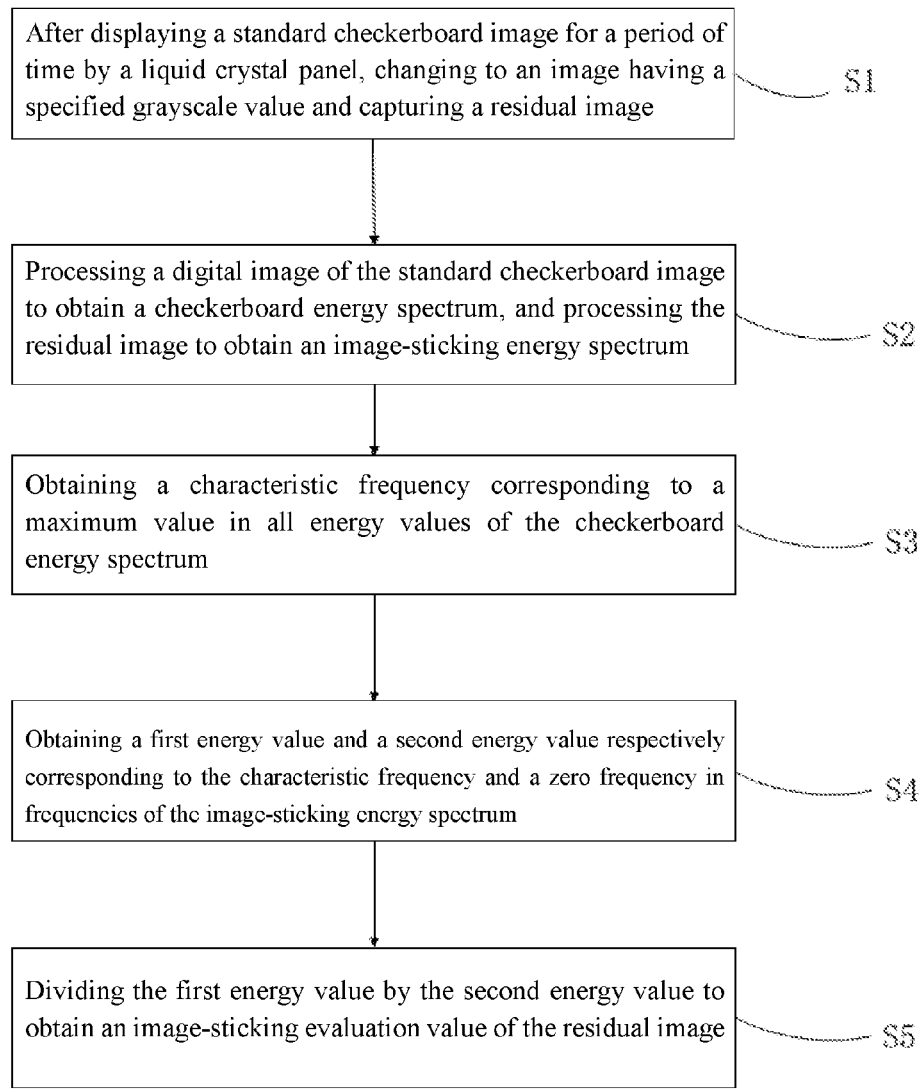
FIG. 1 is a flow chart of an image-sticking inspection method for liquid crystal panel provided by an embodiment of the present invention.
Figure 2:
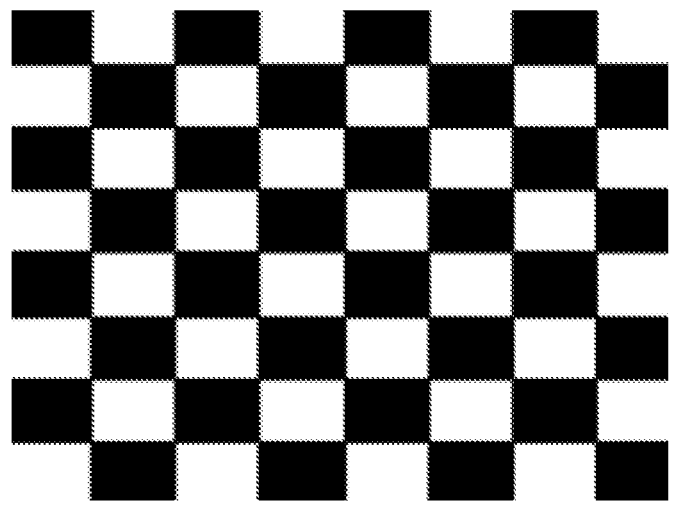
FIG. 2 is a schematic diagram of a standard checkerboard image of the image-sticking inspection method for liquid crystal panel shown in FIG. 1.
Figure 3:
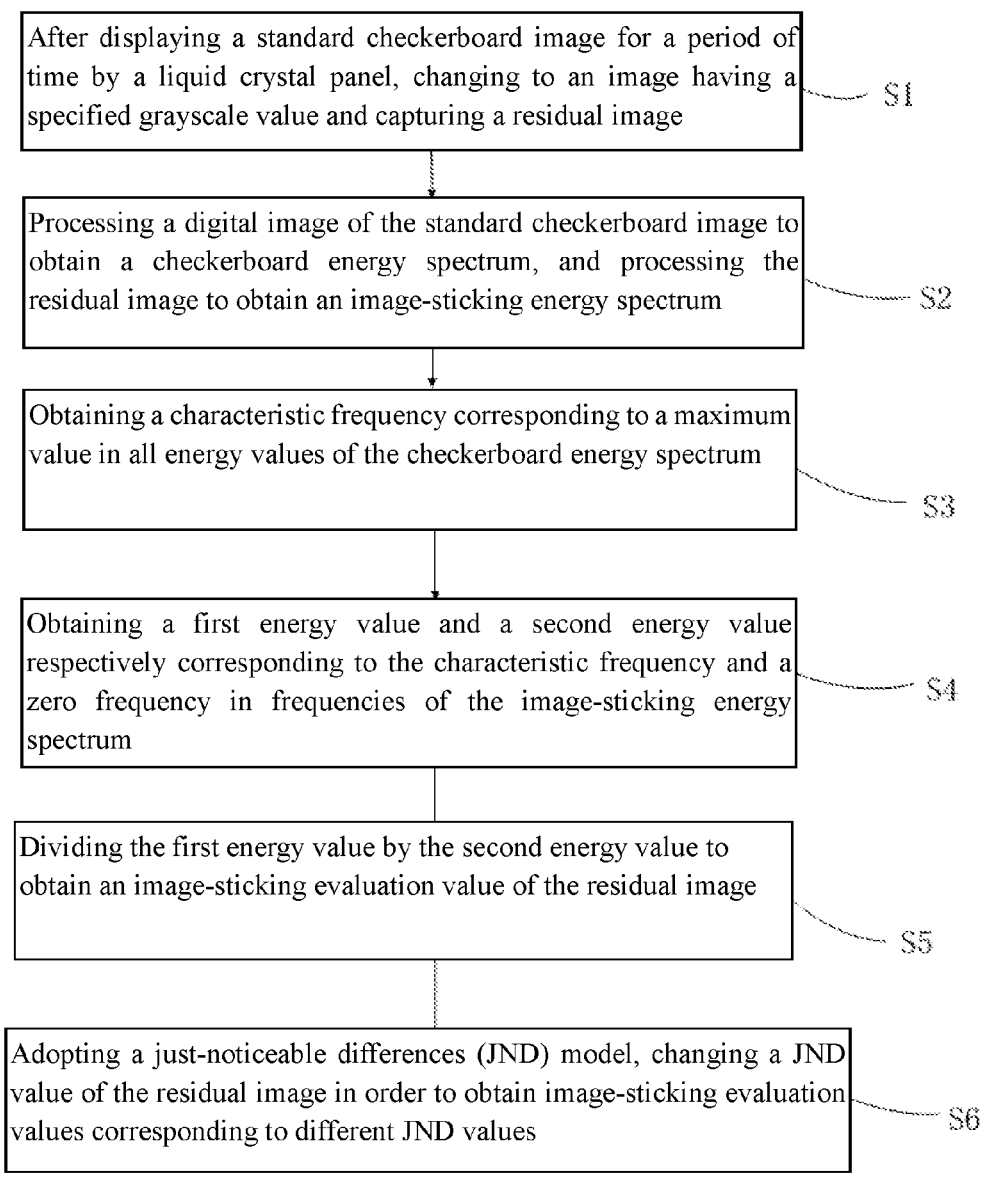
FIG. 3 is a flow chart of another image-sticking inspection method for liquid crystal panel provided by an embodiment of the present invention.

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention With reference to FIG. 1 and FIG. 2, a preferred embodiment of the present invention provides an image-sticking inspection method for liquid crystal panel, and the method comprises:

S1: after displaying a standard checkerboard image for a period of time by a liquid crystal panel, changing a displayed picture of the liquid crystal panel to an image having a specified grayscale value and capturing a residual image of the standard checkerboard image.

In the present embodiment, making the liquid crystal panel to be conductive, the period of time of continuously displaying the standard checkerboard image is 168-169 hours. Each of dark cells of the standard checkerboard image is 0 grayscale intensity, and each of bright cells of the standard checkerboard image is 255 grayscale intensity. Besides, the dark cells and the bright cells are arranged alternately as an 8×8 matrix. The specified grayscale value can be 64 grayscale or 128 grayscale and so on. In the present embodiment, preferably, a grayscale value of 128 is selected. When a displayed picture becomes a pure color image having the grayscale value of 128 from the standard checkerboard image, an image-sticking phenomenon will be generated.

Furthermore, through a standard photo-taking skill to capture the residual image. In the present embodiment, the standard photo skill includes:

Selecting a Cannon 600D camera to take a picture, obtaining a residual image having an M×N resolution. A distance between the camera and the liquid crystal panel is three times of a width of the liquid crystal panel, and taking the picture perpendicular to the liquid crystal panel. The measuring environment is a dark room. Parameters of the camera is: ISO 100; color space sRBG; flash lamp turned off; automatic brightness: turned off; white balance shift/bracketing: 0,0/±0; red-eye reduction on/off: disable; automatic focus mode: real-time mode; grid display: disable; aspect ratio: 3:2; metering timer: 16 second; bass boost: disable; control over HDMI: disable.

S2: processing a digital image of the standard checkerboard image in order to obtain a checkerboard energy spectrum, and processing the residual image of the checkerboard image in order to obtain an image-sticking energy spectrum.

The step S2 specifically includes:

respectively performing a fourier transformation to the digital image of the standard checkerboard image and the residual image in order to obtain a first energy spectrum and a second energy spectrum; wherein, the first energy spectrum corresponds to the digital image of the standard checkerboard image, and the second energy spectrum corresponds to the residual image;

In the present embodiment, according that a resolution of the residual image is M×N, the dark cells and the bright cells of the standard checkerboard image are arranged alternately as a 8×8 matrix, determining that the number of pixels of each dark cell or bright cell is (M/8)×(N/8). Accordingly, a matrix structure that forms the digital image of the standard checkerboard image can be determined. Through assigning values to a matrix that forms the digital image of the standard checkerboard image to obtain the digital image of the standard checkerboard image. That is, each pixel in the dark cells is assigned with 0 grayscale intensity, and each pixel in the bright cells is assigned with 255 grayscale intensity.

Because each zero-frequency component in the spectrums of the digital image of the standard checkerboard image and the residual image which are transformed by the fourier transformation is located at corner location, each zero-frequency component of a function transformed by the fourier transformation should be translated to a center of a corresponding spectrum matrix such that the spectrum matrix is presented by a central symmetry way in order to be convenient for calculating and observing.

Accordingly, in the step of respectively performing a fourier transform to the digital image of the standard checkerboard image and the residual image in order to obtain a first energy spectrum and a second energy spectrum specifically includes: respectively translating a zero-frequency component of a function of the digital image of the standard checkerboard image and a zero-frequency component of a function of the residual image obtained by the fourier transformation to corresponding centers of spectrum matrixes in order to obtain the first energy spectrum and the second energy spectrum.

Furthermore, respectively transforming the first energy spectrum and the second energy spectrum to a polar coordinate, for each frequency and with respect to polar angles changing from 0 to 2π, summing values of function of each of the first energy spectrum and the second energy spectrum in the polar coordinate in order to obtain a checkerboard energy spectrum and an image-sticking energy spectrum.

Wherein, each of the checkerboard energy spectrum and the image-sticking energy spectrum is a function using an energy value as a frequency, wherein, the dependent variable is the energy value and the independent variable is the frequency.

S3: obtaining a characteristic frequency corresponding to a maximum value in all energy values of the checkerboard energy spectrum.

Furthermore, the characteristic frequency corresponding to the maximum value in all energy values of the checkerboard energy spectrum is a primary frequency of the standard checkerboard image.

S4: obtaining a first energy value and a second energy value respectively corresponding to the characteristic frequency and a zero frequency in frequencies of the image-sticking energy spectrum.

Furthermore, because the primary frequency of the standard checkerboard image and the characteristic frequency of the residual image are the same, the characteristic frequency can be adopted to obtain the first energy value corresponding to the characteristic frequency in the image-sticking energy spectrum, and the first energy value represents a strength value of the image sticking of the residual image. The second energy value corresponding to the zero frequency (the frequency value is zero) in the image-sticking energy spectrum is a strength value of background of the residual image.

S5: dividing the first energy value by the second energy value to obtain an image-sticking evaluation value of the residual image.

Furthermore, the evaluation value of the residual image represents a ratio of the strength value of the image sticking to the strength value of the background. When the evaluation value is larger, the image sticking is more serious.

Furthermore, the image-sticking inspection method for liquid crystal panel further includes:

S6: adopting a just-noticeable differences (JND) model, changing a JND value of the residual image in order to obtain image-sticking evaluation values corresponding to different JND values.

The JND model is a traditional method for observing a residual image and estimating a degree of the image sticking. When the JND value is less than 1.8, presenting that image sticking is invisible. According to the degrees of the image sticking, a series of JND values are assigned such as 1.8, 1.9, 2.0 and so on. After through continuously displaying the standard checkerboard image for the period of time multiple times, under a same grayscale value, adopting the JND model to obtain different JND values of the residual images. On one hand, adopting the image-sticking inspection method for the liquid crystal panel to obtain different image-sticking evaluation values. On the other hand, adopting JND model to obtain JND values corresponding to the image-sticking evaluation values. Referring to the JND model of the evaluation system to obtain a series of image-sticking evaluation values for evaluating a degree of the image sticking, a staff member is convenient for performing a batch inspection.

Figure 4:
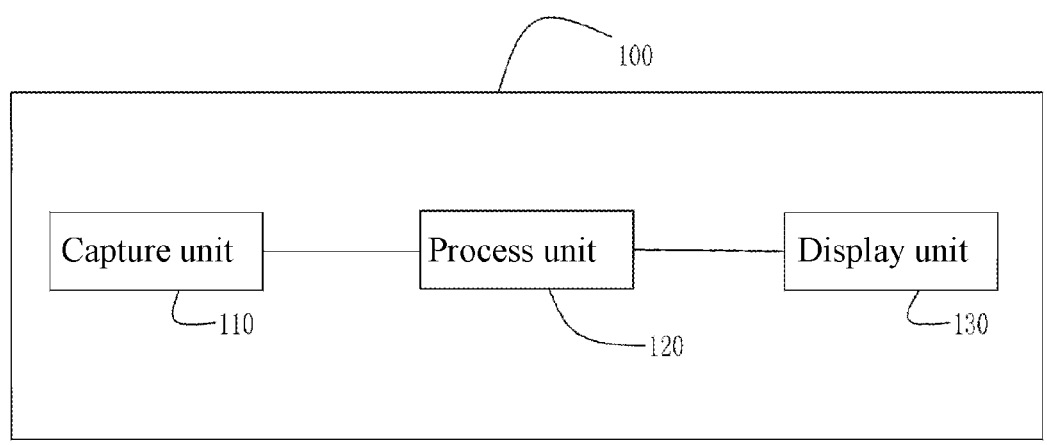
FIG. 4 is a schematic diagram of the image-sticking inspection device for liquid crystal panel provided by an embodiment of the present invention.

With reference to FIG. 4, the present invention also provides an image-sticking inspection device 100 for liquid crystal panel, used for inspecting the image sticking in the manufacturing process of a liquid crystal panel or in a use process. The device 100 includes a capture unit 110, a process unit 120 and a display unit 130.

The capture unit 110 is used for capturing a residual image.

The process unit 120 is used for generating a digital image of a standard checkerboard image, and respectively performing a fourier transformation to the digital image of the standard checkerboard image and the residual image in order to obtain a first energy spectrum and a second energy spectrum;

respectively transforming the first energy spectrum and the second energy spectrum to a polar coordinate to become functions relating to polar angle and frequency; for each frequency and with respect to polar angles changing from 0 to 2π, summing values of the function of each of the first energy spectrum and the second energy spectrum in the polar coordinate in order to obtain a checkerboard energy spectrum and an image-sticking energy spectrum;

obtaining a characteristic frequency corresponding to a maximum value in all energy value of the checkerboard energy spectrum;

obtaining a first energy value and a second energy value respectively corresponding to the characteristic frequency and a zero frequency in frequencies of the image-sticking energy spectrum; and dividing the first energy value by the second energy value in order to obtain an image-sticking evaluation value.

The display unit 130 is used for displaying the image-sticking evaluation value.

Relating to the image-sticking inspection device 100 provided by the present invention, it can be understood that the division of the above units is only a division based on logic function, and can be realized by other ways. For example, multiple units can be combined or integrated into one system, or some units can be omitted.

In the image-sticking inspection method and device provided by the present invention, through performing a fourier transformation to the digital image of the standard checkerboard image and the residual image to obtain respective spectrum function, obtaining the energy strength of the image sticking of the residual image according to the characteristic frequency of the digital image of the standard checkerboard image, and using a ratio of the energy strength of the image sticking of the residual image to the background brightness of the residual image to obtain the image-sticking evaluation value. The present invention can quantitatively evaluate the degree of the image sticking solve inaccurate judgment problem of traditional JND model because of affecting by subjective factors.

The above embodiment does not constitute a limitation of the scope of protection of the present technology solution. Any modifications, equivalent replacements and improvements based on the spirit and principles of the above embodiments should also be included in the protection scope of the present technology solution.

What is claimed is:
1. An image-sticking inspection method for liquid crystal panel, comprising:
after displaying a standard checkerboard image for a period of time by a liquid crystal panel,
changing a displayed picture of the liquid crystal panel to an image having a specified grayscale value and capturing a residual image of the standard checkerboard image; processing a digital image of the standard checkerboard image in order to obtain a checkerboard energy spectrum, and processing the residual image of the checkerboard image in order to obtain an image-sticking energy spectrum;

obtaining a characteristic frequency corresponding to a maximum value in all energy values of the checkerboard energy spectrum;

obtaining a first energy value and a second energy value respectively corresponding to the characteristic frequency and a zero frequency in frequencies of the image-sticking energy spectrum;

dividing the first energy value by the second energy value to obtain an image-sticking evaluation value of the residual image;

wherein, the step of processing a digital image of the standard checkerboard image in order to obtain a checkerboard energy spectrum, and processing the residual image of the checkerboard image in order to obtain an image-sticking energy spectrum comprises:

respectively performing a fourier transformation to the digital image of the standard checkerboard image and the residual image in order to obtain a first energy spectrum and a second energy spectrum; wherein, the first energy spectrum corresponds to the digital image of the standard checkerboard image, and the second energy spectrum corresponds to the residual image; and respectively transforming the first energy spectrum and the second energy spectrum to a polar coordinate; for each frequency and with respect to polar angles changing from 0 to $\pi$ summing values of function of each of the first energy spectrum and the second energy spectrum in the polar coordinate in order to obtain a checkerboard energy spectrum and an image-sticking energy spectrum.

2. The image-sticking inspection method for liquid crystal panel according to claim 1, wherein, the step of respectively performing a fourier transformation to the digital image of the standard checkerboard image and the residual image in order to obtain a first energy spectrum and a second energy spectrum comprises:

respectively translating a zero-frequency component of a function of the digital image of the standard checkerboard image and a zero-frequency component of a function of the residual image obtained by the fourier transformation to corresponding centers of spectrum matrixes in order to obtain the first energy spectrum and the second energy spectrum.

3. The image-sticking inspection method for liquid crystal panel according to claim 1, wherein, through assigning values to a matrix that forms the digital image of the standard checkerboard image to obtain the digital image of the standard checkerboard image.

4. The image-sticking inspection method for liquid crystal panel according to claim 1, wherein, the image-sticking inspection method for liquid crystal panel further comprises:

adopting a just-noticeable differences (JND) model, changing a JND value of the residual image in order to obtain image-sticking evaluation values corresponding to different JND values.

5. The image-sticking inspection method for liquid crystal panel according to claim 1, wherein, through continuously displaying the standard checkerboard image for the period of time multiple times, under a same grayscale value, adopting the JND model to obtain different JND values of the residual images.

6. The image-sticking inspection method for liquid crystal panel according to claim 1, wherein, the residual image is captured by a standard photo-taking skil;a process unit for generating a digital image of a standard checkerboard image, processing a digital image of the standard checkerboard image in order to obtain a checkerboard.

7. An image-sticking inspection device for liquid crystal panel, comprising:

a capture capturing a residual image;

a process, processing a digital image of a standard checkerboard image, processing a digital image of the standard checkerboard image in order to obtain a checkerboard energy spectrum, and processing the residual image of the checkerboard image in order to obtain an image-sticking energy spectrum;

obtaining a characteristic frequency corresponding to a maximum value in all energy values of the checkerboard energy spectrum;

obtaining a first energy value and a second energy value respectively corresponding to the characteristic frequency and a zero frequency in frequencies of the image-sticking energy spectrum; and dividing the first energy value by the second energy value to obtain an image-sticking evaluation value of the residual image;

respectively performing a fourier transformation to the digital image of the standard checkerboard image and the residual image in order to obtain a first energy spectrum and a second energy spectrum, wherein, the first energy spectrum corresponds to the digital image of the standard checkerboard image, and the second energy spectrum corresponds to the residual image; and respectively transforming the first energy spectrum and the second energy spectrum to a polar coordinate; for each frequency and with respect to polar angles changing from 0 to $2\pi$, summing values of function of each of the first energy spectrum and the second energy spectrum in the polar coordinate in order to obtain a checkerboard energy spectrum and an image-sticking energy spectrum.

8. The image-sticking inspection device for liquid crystal panel according to claim 7, wherein, the image-sticking inspection device further includes a display unit, and the display unit is used for displaying the image-sticking evaluation value of the residual image.

\* \* \* \* \*